(12) United States Patent
King (10) Patent No.: US 9,975,791 B2
(45) Date of Patent: May 22, 2018

(54) ION ENHANCEMENT

(71) Applicant: Joseph A King, Wayzata, MN (US)

(72) Inventor: Joseph A King, Wayzata, MN (US)

( * ) Notice: Subject to any disclaimer, the term of this patent is extended or adjusted under 35 U.S.C. 154(b) by 170 days.

(21) Appl. No.: 14/846,522

(22) Filed: Sep. 4, 2015

(65) Prior Publication Data

US 2015/0376037 A1 Dec. 31, 2015

Related U.S. Application Data

(60) Division of application No. 14/028,904, filed on Sep. 17, 2013, now abandoned, which is a division of application No. 12/283,434, filed on Sep. 11, 2008, now abandoned, which is a continuation-in-part of application No. 12/001,351, filed on Dec. 11, 2007, now abandoned, and a continuation-in-part of application No. 11/999,654, filed on Dec. 6, 2007, now Pat. No. 7,501,067, which is a division of application No. 10/928,668, filed on Aug. 26, 2004, now Pat. No. 7,347,934.

(60) Provisional application No. 61/126,105, filed on May 1, 2008.

(51) Int. Cl.
*C02F 1/20* (2006.01)
*C02F 1/50* (2006.01)
*C02F 103/42* (2006.01)

(52) U.S. Cl.
CPC .............. *C02F 1/505* (2013.01); *C02F 1/50* (2013.01); *C02F 2103/42* (2013.01); *C02F 2301/08* (2013.01); *C02F 2303/04* (2013.01)

(58) Field of Classification Search
CPC ........ C02F 1/50; C02F 1/505; C02F 2103/42; C02F 2301/08; C02F 2303/04; C02F 1/76; C02F 1/766
See application file for complete search history.

(56) References Cited

U.S. PATENT DOCUMENTS

| | | | | |
|---|---|---|---|---|
| 5,149,354 A | * | 9/1992 | Delaney | C02F 1/505 210/754 |
| 5,352,369 A | * | 10/1994 | Heinig, Jr. | C02F 1/505 210/501 |
| 5,516,501 A | * | 5/1996 | Kelley | C02F 1/766 210/754 |
| 5,888,428 A | * | 3/1999 | Howarth | C02F 1/766 210/753 |
| 6,508,929 B1 | * | 1/2003 | Mercer | C02F 1/50 204/271 |
| 2003/0186955 A1 | * | 10/2003 | Vange | A01N 43/50 514/184 |
| 2004/0129644 A1 | * | 7/2004 | Unhoch | C02F 1/68 210/749 |

(Continued)

*Primary Examiner* — Lucas Stelling
(74) *Attorney, Agent, or Firm* — Johnson and Phung LLC; Thomas N. Phung (57) ABSTRACT

A method and apparatus for treating a body of water to kill microorganisms by enhancing the concentration metal ions therein. The apparatus comprising a dispenser with a first housing having a water accessible compartment containing 5,5-dimethylhydantoin for releasing the 5,5-dimethylhydantoin when contacted by the body of water and a second housing having a water accessible compartment containing a biocidal metal to the body of water for generating biocidal metal ions when contacted by the body of water containing the 5,5-dimethylhydantoin.

4 Claims, 4 Drawing Sheets

(56) References Cited

U.S. PATENT DOCUMENTS

2006/0043011 A1\* 3/2006 King .................. C02F 1/505
                                                                                210/198.1

\* cited by examiner

FIG. 1 pH levels at water sampling.

| Date | Solution C pH | Solution D pH |
|---|---|---|
| 4/21/2006 | 7.46 | 7.44 |
| 4/28/2006 | 7.43 | 7.41 |
| 5/5/2006 | - | - |
| 5/12/2006 | 7.45 | 7.42 |
| 5/19/2006 | 7.45 | 7.44 |
| 5/26/2006 | 7.42 | 7.44 |
| Average | 7.44 | 7.43 |

FIG. 2

Dissolved silver concentrations

| Date | Solution C Ag(ppb) | Solution D Ag(ppb) | Ratio |
|---|---|---|---|
| Start | Start | Start | Start |
| 4/21/2006 | 4.3 | 2.8 | 2 |
| 4/28/2006 | 17 | 8.7 | 2 |
| 5/5/2006 | 46 | 2.4 | 19 |
| 5/12/2006 | 86 | 2.9 | 30 |
| 5/19/2006 | 140 | 4.0 | 35 |
| 5/26/2006 | 220 | 7.1 | 31 |
| Average | 86 | 4.7 | 18 |

FIG. 3

(STUDY 1: Silver concentration calculated from solubility product of AgBr.)

| Spa Study | Week | Bromide (ppm) | bromide (mol/L) | Calculated Silver (mol/L) | Calculated Silver (ppb) | Actual Silver (ppb) |
|---|---|---|---|---|---|---|
| 1 | 1 | 110 | 0.001377 | 3.8862E-10 | 0.04 | BRL |
| | 2 | 120 | 0.001502 | 3.5624E-10 | 0.04 | BRL |
| | 3 | 130 | 0.001627 | 3.2884E-10 | 0.04 | BRL |
| | 4 | 150 | 0.001877 | 2.8499E-10 | 0.03 | BRL |
| | 5 | 140 | 0.001752 | 3.0535E-10 | 0.03 | BRL |
| | 6 | 160 | 0.002002 | 2.6718E-10 | 0.03 | BRL |
| | 7 | 150 | 0.001877 | 2.8499E-10 | 0.03 | BRL |
| DMH added | 8 | 106 | 0.001327 | 4.0329E-10 | 0.04 | BRL |
| | 9 | 101 | 0.001264 | 4.2325E-10 | 0.05 | BRL |
| | 10 | 143 | 0.001790 | 2.9894E-10 | 0.03 | 7.0 |
| | 11 | 36.2 | 0.000453 | 1.1809E-09 | 0.13 | 5.0 |
| | 12 | 130 | 0.001627 | 3.2884E-10 | 0.04 | 5.0 |
| | 13 | 300 | 0.003755 | 1.425E-10 | 0.02 | 5.0 |

- BRL- Dissolved silver concentration is below reporting limit.

FIG. 4

(STUDY 2: Silver concentration calculated from solubility product of AgBr.)

| Spa Study | Week | Bromide (ppm) | bromide (mol/L) | Calculated Silver (mol/L) | Calculated Silver (ppb) | Actual Silver (ppb) |
|---|---|---|---|---|---|---|
| 2 | 1 | 26 | 0.000325 | 1.6442E-09 | 0.18 | BRL |
| | 2 | 90 | 0.001126 | 4.7498E-10 | 0.05 | BRL |
| | 3 | 74 | 0.000926 | 5.7768E-10 | 0.06 | BRL |
| DMH added | 4 | 59 | 0.000738 | 7.2455E-10 | 0.08 | BRL |
| | 5 | <10 | NA | NA | NA | 5.0 |
| | 6 | 64 | 0.000801 | 6.6795E-10 | 0.07 | 6.0 |
| | 7 | <10 | NA | NA | NA | BRL |
| | 8 | <10 | NA | NA | NA | 5.0 |

- BRL- Dissolved silver concentration is below reporting limit.

FIG. 5

(STUDY 3: Silver concentration calculated from solubility product of AgBr)

| Spa Study | Week | Bromide (ppm) | bromide (mol/L) | Calculated Silver (mol/L) | Calculated Silver (ppb) | Actual Silver (ppb) |
|---|---|---|---|---|---|---|
| 3 | 1 | NA | NA | NA | NA | BRL |
| DMH added | 2 | < 10 | NA | NA | NA | BRL |
| | 3 | < 1 | NA | NA | NA | BRL |
| | 4 | < 50 | NA | NA | NA | BRL |
| | 5 | < 50 | NA | NA | NA | 5.5 |
| | 6 | < 10 | NA | NA | NA | 5.0 |
| | 7 | 57 | 0.00071 | 7.50E-10 | 0.081 | 5.0 |
| | 8 | 5.3 | 0.00007 | 8.07E-09 | 0.870 | 6.0 |
| | 9 | 44 | 0.00055 | 9.72E-10 | 0.105 | 6.5 |

- BRL- Dissolved silver concentration is below reporting limit. The reporting limit is the lowest concentration of an analyte for which there is a defendable degree of accuracy and precision for a specific data set. For these data the lowest reporting limit is 5.0 ppm. Data are rounded to nearest 0.5 ppb.

ION ENHANCEMENT

CROSS-REFERENCE TO RELATED APPLICATIONS, IF ANY

This application is a division of pending application Ser. No. 14/028,904, filed Sep. 17, 2013, titled ION ENHANCEMENT, which is a division of abandoned application Ser. No. 12/283,434, filed Sep. 11, 2008, titled ION ENHANCEMENT, which is a continuation-in-part of abandoned U.S. application Ser. No. 12/001,351; filed on Dec. 11, 2007; titled ION ENHANCEMENT and U.S. application Ser. No. 12/283,434, filed Sep. 11, 2008, titled ION ENHANCEMENT also is a continuation-in-part of U.S. application Ser. No. 11/999,654; filed on Dec. 6, 2007; titled BIOCIDE, now U.S. Pat. No. 7,501,067, which is a divisional application of U.S. application Ser. No. 10/928,668; filed on Aug. 26, 2004; titled BIOCIDE; now U.S. Pat. No. 7,347,934.

FIELD OF THE INVENTION

This invention relates generally to water treatment and more specifically, to the combination of a metal ion donor and 5,5-dimethylhydantoin to enhance the effectiveness of the metal ion donor in kill microorganisms in a body of water.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of treating water with of metallic ions to kill bacteria in a body of water is known in the art. A metallic ion such as a silver ion is an effective bactericide for a body of water including recreational water such as swimming pools, spas, jetted tubs or the like and is a preferred material because it is generally easier and safer to use than other known bactericides or algaecides. A further advantage of using silver ion as a bactericide is that silver ion minimizes the need for pH adjustment of the body of water. However, if the concentration of metallic ions such as silver ions in a body of water is too low the ability to kill microorganisms is reduced or lost. On the other hand if the concentration of metallic ions such as silver ions is too high it can be harmful to those who use the body of water. Thus when silver ion is used as a disinfectant in a body of water one generally want to maintain the concentration of the silver ion in an effective range to kill microorganisms.

The concept of introducing biocidal metals into a body of water to generate biocidal metal ions, such as silver ions, to sanitize the body of water is known in the art. The use of these ions to purify the body of water results in decreased need for chlorination. An example of a method of introducing biocidal metal ions into water involves the use of sacrificial electrodes containing metals corresponding to the desired ions, including alloys of silver and copper, and electrolytically dissolving the metals into the water. Other methods of introducing biocidal metal ions into water include contacting the water with substrates that have been coated or impregnated with pure or alloyed metal, soluble metal salts, or some combination thereof.

Traditionally, the sources of metallic ions used to kill bacteria in recreational water have been limited to metallic ion donors that are readily soluble in the recreational water in order to maintain an effective concentration of the biocides in the body of water. Silver chloride (AgCl), for example, has been a commonly used bactericide for releasing silver ions into the body of water to effectively kill microorganisms. Sodium bromide has also been known to be used with silver chloride to provide an additional and alternative water disinfection system.

One of the problems associated with the use of silver for killing microorganisms is that silver has a tendency to complex with other compounds and become increasingly insoluble thereby reducing the effective microorganisms killing ability of the silver. For example, it would not be anticipated that silver chloride when used in combination with sodium bromide would be an effective disinfectant system because of the combination's tendency to form insoluble bromide crystals, which are not believed to be biologically active in aqueous environments. However, it has been discovered that if silver forms a complex with hydantoins, the silver will remain soluble to a higher degree thereby retaining the silver's antimicrobial activity.

The present invention includes a device and method for using metal ion donors in combination with hydantoins including unhalogenated hydantoins such as 5,5-dimethylhydantoin (hereinafter "DMH") to enhance a concentration of the metal ions in the body of water or to enhance the solubility of metal ions from other metal ion donors to retain the silver's antimicrobial activity in the water.

SUMMARY OF THE INVENTION

Briefly, the present invention comprises a method and a device for killing microorganisms in a body of water through the enhancement of a concentration of metal ion donor even in situations where the metal ion donors are generally insoluble or not sufficiently soluble in recreational water to maintain an effective concentration of the metal ion donor in soluble form in the body of water.

The device generally comprises a first housing having a water accessible compartment containing an unhalogenated hydantoins such as 5,5-dimethylhydantoin for releasing the 5,5-dimethylhydantoin when contacted by the body of water and a second housing having a water accessible compartment containing a biocidal metal for generating biocidal metal ions into the body of water when contacted by water containing the 5,5-dimethylhydantoin to maintain a higher biocidal metal ion level in the body of water in killing microorganisms than if biocidal metal ions were used alone in killing microorganisms in the body of water.

The method includes the steps of adding a biocidal metal to the body of water and adding sufficient 5,5-dimethylhydantoin to the body of water to interact with the biocidal metal to enhance the biocidal metal ion concentration to effectively to kill microorganisms. A further embodiment includes the tabletizing of the 5,5-dimethylhydantoin with the biocidal metal so that the combination can be placed in a body of water to be disinfected.

DESCRIPTION OF THE PREFERRED EMBODIMENT

Hydantoin structures are known complexing agents in silver-plating processes (R. J. Morrissey, U.S. Patent Application Publication no. 2005/0183961). Studies performed by the inventor have demonstrated that halogenerated hydantoins such as Bromochlorodimethylhydantoin (BCDMH) and Dichlorodimethylhydatoin (DCDMH) tend to increase levels of dissolved silver. While not fully understood it is believed that the aforementioned increased in solubility is due to the soluble complex between silver and hydantoin ring structures as it has been found the silver remains soluble to a higher degree than expected.

The present invention has found that unhalogenerated hydantoins, such as 5,5-dimethylhydantoin (DMH), also has the qualities to interact with metal ion donors including silver metal ion donors such as the silver bromide to increase the solubility of the silver bromide in a water environment and aid in the disinfection process. That is, with a silver ion donor in the presence of DMH, it has been discovered that the dissolved silver concentrations are higher than anticipated when compared to a control solution without the presence of DMH. The results suggested that DMH interacts with silver to form a soluble complex even if the source(s) of silver are from insoluble salts such as silver bromide, which in some cases may be derived from silver chloride.

In order to verify that the DMH interacts to increase the solubility of extremely insoluble silver, the following tests were performed using either silver chloride or silver bromide as the donor of metal ions in order to demonstrate the enhancement of a silver concentration in a body of water when DMH is used in combination.

Example 1

Silver bromide was initially prepared from a saturated sodium bromide solution, combined with silver nitrate in solution. The yellow precipitate, silver bromide, was than purified by filtration and washing. Additionally, the solid was allowed to dry before use.

A buffer system having a pH of 7.41 was prepared by adding Fisherbrand® potassium phosphate monobasic-sodium phosphate dibasic buffer to 2 Erlenmeyer flasks filled with 1000 mL of purified water. The first flask was treated with 1.12 grams of 5,5-dimethylhydantoin (DMH) and marked solution "D" and the second flask was left untreated and marked solution "C" for control. In regards to the 5,5-dimethylhydantoin (DMH), the 5,5-dimethylhydantoin (DMH) comprised 97% reagent grade was obtained from Aldrich® (CAS No. 77-714, Cat. No. D161403-1KG).

After the initial set-up, approximately 0.10 grams of dried silver bromide was introduced into a dialysis tubing (Fisherbrand®, 45 mm, MWCO 12,000-14,000) along with purified water. The ends of the dialysis tubing were clamped to contain the silver bromide and purified water. Next, the outside of the dialysis tubing was rinsed several times to ensure that silver bromide residue was not on the outside of the dialysis tubing. A string was then tied to one clamp, and one tube was introduced into each flask. A magnetic stir bar was used to mix the solutions.

During the period of the test, a 100 ml sample were removed from solution "D" and solution "C" at weekly intervals and analyzed for their pH using Orin Perphect Meter 370 and analyzed for their silver ion concentrations using atomic absorption spectrometry.

Figure 1:
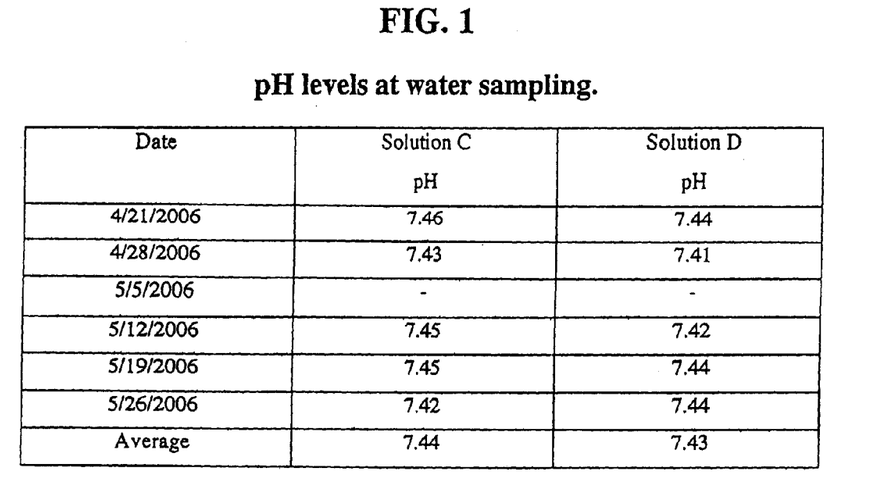
FIG. 1 shows a table of the pH levels of a solution containing DMH and a solution without DMH at weekly time intervals.

FIG. 1 shows a table containing a list of the pH levels obtained from the 100 ml samples for both solution "D" and solution "C" at each of their respective weekly time intervals. It is noted that the preferred pH level for recreational water used in spas, pools, swimming pools, jetted bathtubs and other confined bodies of water is between 7.20 to 7.60 and that the mean value of the pH level measured during the length of the test for both solution "D" and solution "C" was around 7.4, which is within the preferred range.

Figure 2:
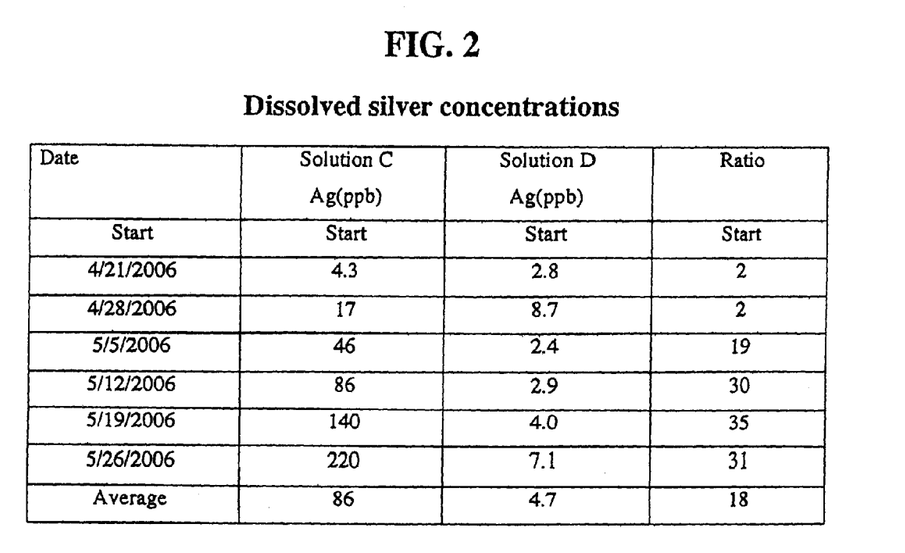
FIG. 2 shows a table of the dissolved silver concentrations of a solution containing DMH and a solution without DMH.

FIG. 2 shows a table containing a list of the dissolved silver concentration, in parts per billion (ppb) obtained from the 100 ml samples for solution "D" and solution "C" at each of their respective weekly time intervals. The average concentration of dissolved silver for solution "D", which contained the DMH, was 86 ppb while solution "C", containing no DMH, had an average concentration of dissolved silver of 4.7 ppb.

A week after the start date, the concentration of dissolved silver for solution D was at 4.3 ppb, while the concentration of dissolved silver for solution C was at 2.8 ppb. By the end of the testing, 6 weeks later, the concentration of dissolved silver for solution D had increase to 220 ppb, while the concentration of dissolved silver for solution C was 7.1 ppb. That is, by the end of the 6 weeks test, the concentration of dissolved silver was at least 30-fold greater in solution D containing the DMH then for solution C containing no DMH.

In summary, the results of the above testing confirmed that in a solution containing silver bromide, the presence of DMH leads to a higher dissolved silver concentrations than compared to a control solution containing silver bromide without the presence of the DMH. These results suggest that DMH interacts with silver to form a soluble complex even if the source of silver comprises an extremely insoluble silver salt such as silver bromide.

Example 2

In the second test, two test spas were used in performing 3 studies to evaluate the potential use of DMH to increase silver solubility in the presence of alternative disinfection systems such as sodium bromide. The first spa used was a 125-gallon Marquis brand triangle shaped spa having the dimensions 60"×60"×82" with a height of 32" and a water depth of 27" without bathers. This spa featured 13 jets and one pleated filter cartridge (Unicel 5CH-502), having a filtration area of 50 square feet. The second spa was a 325-gallon Dimension One® brand spa having the dimensions 90"×90"×35.5" with a water depth of approximately 25" without bathers. The Dimension One® brand spa featured 32 jets and two pleated filter cartridges (Unicel 7CH-975), each having a filtration area of 75 square feet. Spa water was maintained between 100° F. (37.8° C.) to 104° F. (40° C.) and was circulated at least 2 hours daily.

In the each of the studies, a reagent grade Dimethylhydantoin (DMH, CAS No 77-71-4) obtained from Aldrich® with a 97% purity, was used. A concentration of 5 ppm DMH was selected because that amount of DMH can be delivered in the existing King Technology, Inc. Spa Frog® Mineral Cartridge to a 600 gallon spa, the largest volume for the cartridge was designed.

The source of silver ions was obtained from a King Technology Inc. Spa Frog® Mineral Cartridge, which was randomly selected from King Technology Inc.'s production inventories for use in these studies and installed into the in-line system on the spa. These mineral cartridges release silver ions into the spa in the form of silver chloride.

In Spa Studies 1 and 2, a commercially available sodium bromide disinfectant system (Rendezvous®) was used. With this bromine disinfectant system, the sodium bromide solution is oxidized by the addition of potassium peroxymonosulfate.

For Spa Study 3, different sodium bromide disinfecting systems were evaluated in two phases. During the first phase, the commercially available sodium bromide oxidized by the sodium dichloro-s-triazinetroine disinfectant known as Spa Essentials® Brominating Concentrate was used. For the second phase of the spa study reagent grade sodium bromide salt and potassium peroxymonosulfate was used.

Addition of DMH

During the study, the test spa was filled with fresh water prior to the initiation of each study and the water balanced according to Taylor Technologies Pool & Spa Water Chemistry Manual. The pH was reduced through the addition of sodium bisulfate (pH Down Balancer, GLB, Alpharetta, Ga.) to a range from 7.2 to 8.0. After balancing the spa the King technology, Inc. Spa Frog® Mineral Cartridge was installed into the inline system of the test spa and a source of bromine was added to the spa water.

In Spa Study 1 an amount of DMH was added to the spa water after 7 weeks of silver data had been collected to result in a final concentration of 5 ppm. For Spa study 2, an amount of DMH was added to the spa water after 3 weeks of silver data had been collected to result in a final concentration of 5 ppm, and for Spa Study 3 an amount of DMH was added to the spa water after 1 week of silver data had been collected to result in a final concentration of 5 ppm.

Sodium bromide or brominating concentrate (dichloro-striazinetrione plus sodium bromide) was added to each spa during test intervals. Typically, sodium bromide was activated by oxidation to bromine with potassium peroxymonosulfate. Alternatively, when the brominating concentrate (dichloro-striazinetrione plus sodium bromide) was used, the sodium dichloro-s-triazinetrione oxidized the sodium bromide to make bromine in-situ. Additional water was added to the spa when the water level dropped below the skimmer water returns.

Water Testing

Figure 3:
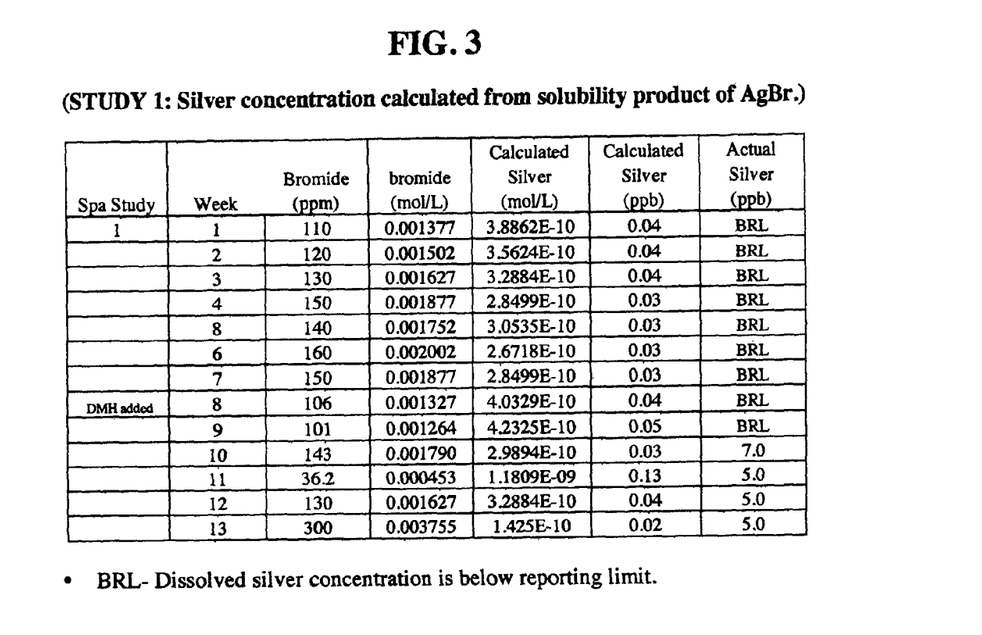
FIG. 3 shows a table containing the test results for bromide and dissolved silver concentration for Spa Study 1.
Figure 4:
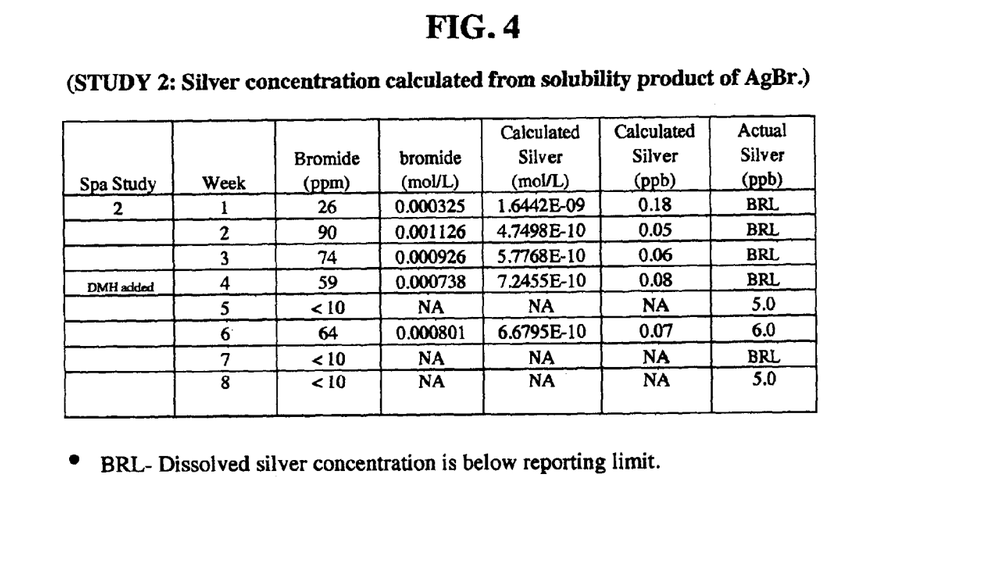
FIG. 4 shows a table containing the test results for bromide and dissolved silver concentration for Spa Study 2.
Figure 5:
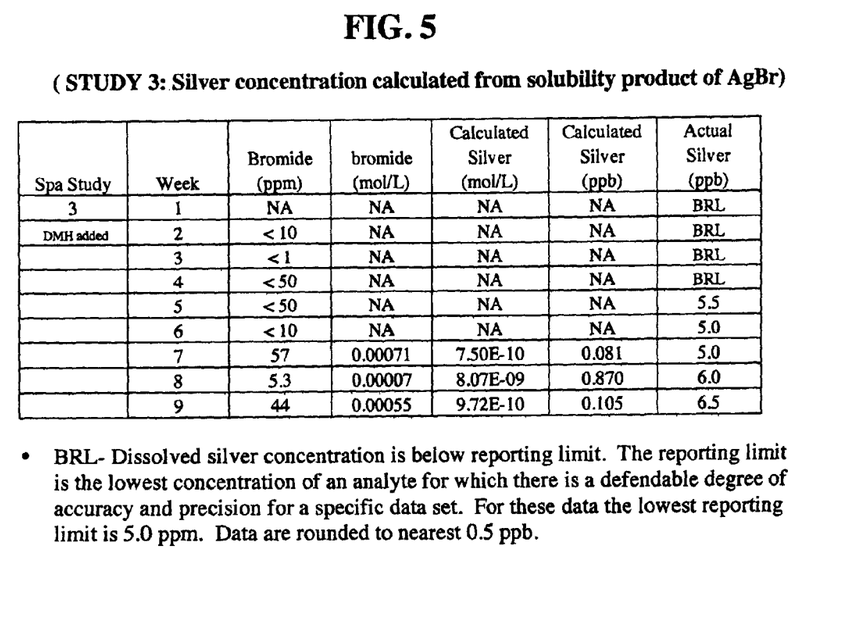
FIG. 5 shows a table containing the test results for bromide and dissolved silver concentration for Spa Study 3.

Chemical tests were performed with water samples obtained from each of the spa for dissolved silver, bromide, and chloride approximately once a week. Bromide was tested to provide a means to calculate the theoretical silver concentration based on the solubility product of silver bromide. The spa water samples were each tested for the bromine, and dissolved silver concentration. Result of the test for bromide and dissolved silver concentration are shown in FIG. 3 for Spa Study 1, are shown in FIG. 4 for Spa Study 2, and are shown in FIG. 5 for Spa Study 3.

Additionally, to maintain the water within the spa total alkalinity, turbidity, and pH were tested and maintained within ranges accepted by the industry. The ideal pH for a spa is 7.20 to 7.60, however wider ranges are acceptable. In the studies, the average pH for Spa Study 1 was 7.51, Spa Study 2 showed an average pH of 7.61, and Spa Study 3 had an average pH of 7.47. These three spa studies were maintained within the ideal pH for a spa.

The International Aquatic Foundation (ANSI/NSPI) recommends a level of total bromine to be between 2.0-4.0 ppm for residential spas with a max of 6.0 ppm. In the studies, the average total bromine concentration measured for Spa Study 1 was 3.74 ppm, the average total bromine concentration measured for Spa Study 2 was 636 ppm, and the average total bromine concentration measured for Spa Study 3 was 3.58 ppm.

In regards to the level of silver ions, the King Technology, Inc. Spa Frog® Mineral Cartridge provides silver ions in the form of solid silver chloride (AgCl) distributed over a porous matrix. Water flowing through the matrix comes into contact with the AgCl resulting in the release of soluble silver ions to water. DMH was also released into the water resulting in the formation of ionic-hydantoin structures. It would be anticipated that soluble silver ions would be depleted from spa water through the formation of silver bromide, an insoluble salt. However, as shown in FIG. 3 for Study 1, after the DMH was added to the water in the pool, the actual silver concentrations were higher than the calculated theoretical silver concentration.

The result of Study 1 were further supported in Study 2 and Study 3, shown in FIGS. 4 and 5, which both show that after the DMH was added to the water in the pool, the actual silver concentrations were higher than the calculated theoretical silver concentration. More specifically, once measurable within reporting limits the average measured concentration of dissolved silver for Spa Study 1 was 5.5 ppb. Spa Study 2 had an average measured concentration of 5.33 ppb for dissolved silver and the third Spa Study had a measured concentration of dissolved silver of 3.2 ppb. Referring to FIGS. 3, 4, and 5, the highest observed silver concentration in each spa study was, 7 ppb, 6 ppb, and 6.5 ppb, respectively.

Referring to FIGS. 3, 4, and 5, the results of the three spa studies revealed that before the addition of DMH, dissolved silver concentration was below the official reporting limit of 4.8 parts per billion (ppb). However, around one to three weeks after the addition of a concentration of 5 ppm DMH, silver concentrations in each of the Spa Studies increased above the reporting limit, and were significantly higher than concentrations that would be anticipated based on silver solubility calculations from silver bromide. The above results of Spa Studies 1, 2, and 3 thus supports the finding that the combination of an unhalogenated hydantoin such as 5,5-dimethylhydantoin with a metal ion donor such silver bromide enhances a concentration of the metal ions in the body of water by retaining or increasing the solubility of metal ions from other metal ion donors to retain the antimicrobial activity of the metal ions in the water.

Figure 6:
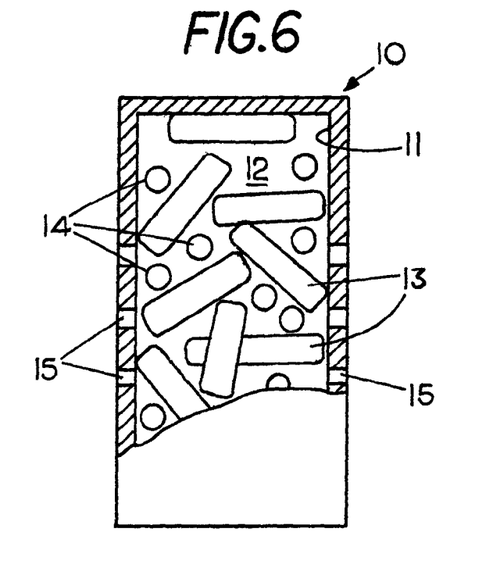
FIG. 6 shows a dispenser having a housing containing a compartment containing DMH and a silver ion donor comprising metallic silver therein.
Figure 7:
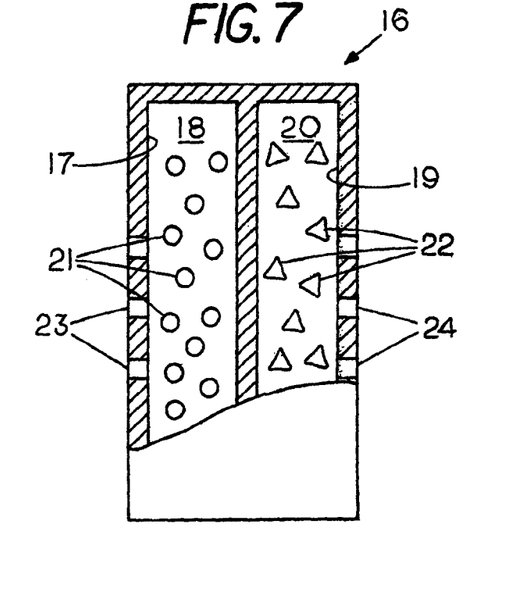
FIG. 7 shows a dispenser having a first housing containing DMH and a second housing containing silver ion donor comprising metallic silver therein.

Referring to FIGS. 6 and 7, FIG. 6 shows an embodiment of an apparatus of the present invention comprising a dispenser 10 having a housing 11 containing a compartment 12 therein. Located in compartment 12 is a source of DMH 13 and a biocidal component such as a source of biocidal metal for generating biocidal metal ions into the body of water. Although various types of biocidal metal such as zinc or copper may be use, in the present embodiment the biocidal metal used comprises silver, silver alloy or some combination thereof, because of the recognized bactericidal, viricidal, and algaecidal properties of silver. The biocidal metals can be introduced as metallic, zero valence material, or as metal ions that can be introduced into the water by dissolution of soluble metal salts, or by the dissolution of the metal itself. For example, silver ion can be introduced into the water through the dissolution of silver nitrate, or through the dissolution of metallic silver as the result of conversion to silver oxide and subsequent conversion of the oxide to more soluble silver species. Mixtures of different salts, or of salts with metallic material, may be combined together to provide the necessary concentration of metal ions in the water. In the embodiment of FIG. 6, the biocidal metal comprises metallic silver 14. A set of openings 15 allows water access to compartment 12 and to the source of DMH 13 and the metallic silver 14.

It is noted that various insoluble or slightly soluble transition metal salts may also be used in the present invention as a source of silver ions. Examples of insoluble or slightly soluble transition metal salts suitable for use in the present invention include, but are not limited to, AgCl, AgBr, AgI, $Ag_2S$, $Ag_3PO_4$, $NaAg_2PO_4$, CuS, and $NaCuPO_4$. Other examples of silver compounds include, but are not limited to, $AgNO_3$, $Ag_2CO_3$, AgOAc, $Ag_2SO_4$, $Ag_2O$, [Ag(NH_3)_2]Cl, [Ag(NH_3)_2]Br, [Ag(NH_3)_2]I, [Ag(NH_3)_2]NO_3, [Ag(NH_3)_2]_2SO_4, silver acetoacetate a silver benzoate, a silver carboxylate, silver amine complexes such as $[Ag(NR_3)_2]X$, where R is an alkyl or aryl group or substituted alkyl or aryl group and X is an anion such as, but not limited to, $Cl^-$, $Br^-$, $I^-$, $OAc^-$, $NO_3^-$ and $SO_4^{2-}$.

FIG. 7 shows an alternative embodiment of an apparatus of the present invention comprising a dispenser 16 having a first housing 17 containing a compartment 18 and a second housing 19 with a compartment 20 therein. Located in compartment 18 is a silver ion donor such as metallic silver 21 and located in compartment 20 is a source of DMH 22. A set of openings 23 allows water access to compartment 18 and to the metallic silver 21. Similarly, a set of openings 24 allows water access to compartment 20 and the source of DMH 22.

Although the use of the silver ion donor such as silver, silver oxide, silver salt, or a combination thereof have been disclosed in the present invention, various types of silver alloys may also be used. The silver may be used standing along in its pure/elemental or alloyed form or coated or impregnated to a substrate and placed in compartment 18. In addition, other types of silver ion donors, other types of transition metal, a transition metal oxide, or a combination thereof, and other alternative bactericides whose solubility can be changed in the presence of DMH can also be used in the present invention.

In regards to the source of DMH 13, 22 of FIGS. 6 and 7, note that FIG. 7 shows source of DMH 22 in particle form with the aforementioned particles having an initial size that is larger than the size of opening 23 to prevent the DMH particles from escaping through opening 23. FIG. 6 shows source of DMH 13 in tablet form. In regards to the DMH tablets, it is noted that various types of material, including but not limited to microcrystalline cellulose (MCC), may be used as a binder in the formation of the DMH tablets which are tabletized with the metal ion donor so that both the DMH and the metal ion donor can be placed in the body of fluid to be treated.

It is also noted that the preferred level of the DMH present in the body of water is between 5 and 25 ppm with the DMH and the source of silver cooperating to maintain a level of silver ions present in the amount of 1 to 3 ppb and/or alternatively cooperating to maintain a level of silver ions present to sustain a standard plate count at 35 degrees F. of less than 200 colonies per milliliter.

The present invention includes the step of placing the dispenser 10, 16 containing both the source of DMH 13, 22 and the metallic silver 14, 21 in the body of water and allowing water to come into contact with the source of DMH 13, 22 and the metallic silver 14, 21 to periodically release DMH and silver ions into the body of water. As the DMH is released into the body of water, the DMH is carried to the metallic silver 14, 21 and interacts with the metallic silver 14, 21 to increase the solubility of the silver ions to allow for the release of more silver ions into the body of water than the metallic silver 14, 21 alone.

The present invention also include a method of treating a body of water to kill microorganisms by enhancing the microbial agents comprising the steps of (1) adding a biocidal component 14, 21 to the body of water; and (2) adding a concentration of 5,5-dimethylhydantoin 13, 22 to the body of water to enhance the effectiveness of the biocidal component 14, 21 in the body of water to thereby lessen the need for a supplemental biocide. The aforementioned method can also include the steps of (3) adding a transition metal, a transition metal oxide, a transition metal salt, or a combination thereof to the body of water; (4) adding silver, silver oxide, silver salt, or a combination thereof to the body of water; (5) adding a substrate that has been coated or impregnated with metallic silver, silver salt, or a combination thereof to the body of water; (6) a silver alloy to the body of water; (7) adding silver nitrate to the body of water; (8) adding a carrier containing a silver deposit to the body of water; (9) adding a silver-containing material to the body of water; (10) placing a dispenser 10, 16 containing both the biocidal component 14, 21 and the 5,5-dimethylhydantoin 13, 22 in the body of water and allowing water to come into contact with both the biocidal component 14, 21 and the 5,5-dimethylhydantoin 13, 22; (11) adding an amount of 5,5-dimethylhydantoin 13, 22 in the body of water to obtain a final concentration of at least 5 ppm 5,5-dimethylhydantoin; and adding a supplemental water disinfection system comprising sodium bromide.

The present invention further include a method of treating a body of water to kill microorganisms by enhancing the microbial agents comprising the steps of: (1) adding a biocidal metal 14, 21 to the body of water to generate biocidal metal ions in the body of water; and (2) adding 5,5-dimethylhydantoin 13, 22 to the body of water to interact with the biocidal metal 14, 21 to enhance the biocidal metal ion concentration in the body of water. The aforementioned method can also include the steps of (3) adding a metallic silver to the body of water; (4) adding metallic silver alloy 14, 21 to the body of water; (5) placing a dispenser 10, 16 containing both the biocidal metal 14, 21 and the 5,5-dimethylhydantoin 13, 22 in the body of water and allowing water to come into contact with both the biocidal metal 14, 21 and the 5,5-dimethylhydantoin 13, 22; (6) adding a metallic silver coated or impregnated substrate 14, 21 to the body of water; and adding pure silver 14, 21 to the body of water.

I claim:

1. A method of treating a body of water to kill microorganisms by enhancing the microbial agents comprising the steps of:

adding alloyed metallic silver to the body of water;
converting metallic silver in the alloyed metallic silver to silver oxide, and then forming silver ions in the water to maintain a soluble silver level of between 1.0 ppb to 3.0 ppb in the body of water;

adding a concentration of 5,5-dimethylhydantoin to the body of water to enhance the concentration of soluble silver in the body of water to sustain a standard plate count at 35 Degrees Fahrenheit of less than 200 colonies per milliliter and to maintain a 5,5-dimehtylhydantoin level of between 5.0 ppm and 25 ppm in the body of water.

2. The method of claim 1 further comprising the step of adding silver nitrate to the body of water.

3. A method of treating a body of water to kill microorganisms by enhancing the microbial agents comprising the steps of:

maintaining a silver level between 1.0 ppb to 3.0 ppb in the body of water by adding a metallic silver to the body of water, converting the metallic silver to silver oxide, and then generating silver ions in the body of water;

adding 5,5-dimethylhydantoin to the body of water to form a soluble silver complex of at least the silver ions and the 5,5-dimethylhydantoin in the body of water and to maintain a 5,5-dimethyl hydantoin level of between 5.0 ppm and 25 ppm in the body of water;

wherein forming the soluble silver complex inhibits the formation of insoluble silver compounds.

4. The method of claim 3 wherein the metallic silver comprises alloyed metallic silver.

\* \* \* \* \*